United States Patent

Meredith, Sr.

[15] 3,704,492

[45] Dec. 5, 1972

[54] SAFETY BELT BUCKLE CONSTRUCTION

[72] Inventor: Edwin L. Meredith, Sr., 516 N. Main Street, Cleburne, Tex. 76031

[22] Filed: Dec. 20, 1971

[21] Appl. No.: 209,992

[52] U.S. Cl...............................24/223, 24/230 AN
[51] Int. Cl..........................A44b 17/00, A44b 11/26
[58] Field of Search.....26/223, 222 R, 224 R, 201 A, 26/230 AN, 230 AT, 230 BC; 248/224

[56] References Cited

UNITED STATES PATENTS 3,631,572  1/1972  Lange......................................24/223

FOREIGN PATENTS OR APPLICATIONS 511,047  3/1955  Canada............................24/230 BC Primary Examiner—Bernard A. Gelak
Attorney—Harvey B. Jacobson et al.

[57] ABSTRACT

A safety belt buckle capable of being securely fastened and released using only one hand at a time comprises a connector member and a casing member positively locked together by a mechanism which includes a biased slidable element in the casing member adapted to engage a recess in the connector member. The members may be released by depressing a release mechanism which overcomes the bias and withdraws the slidable element from locking engagement with the recess.

8 Claims, 4 Drawing Figures

PATENTED DEC 5 1972

3,704,492

SAFETY BELT BUCKLE CONSTRUCTION

The present invention relates to safety belt buckle construction and, more particularly, to adjustable safety belt buckles which may be securely fastened and quickly released using only one hand.

Typical safety belt buckles in common use comprise a housing member containing a locking mechanism and a plate-like securing member adapted to be engaged with said locking mechanism. The engagement is accomplished by grasping the respective members, one in each hand, and inserting the leading edge of the plate-like member into the leading edge of the housing member until the members lock in place. Two hands are required to fasten such a buckle. Therefore, it cannot safely be fastened by the driver of a vehicle in motion. Too often, therefore, when the driver omits to fasten his belt before beginning to move, safety belts are not used because of the inconvenience and danger associated with fastening them while underway.

Attempts have been made to design a safety belt buckle which can be safely fastened while driving. However, such buckles have heretofore sacrificed buckle safety for ease of fastening. U. S. Pat. No. 3,513,510 — Copes, discloses one such buckle, in which ease of fastening is accomplished at the expense of a positive lock between the male and female components of the buckle. Thus, Copes provides a buckle which is engaged when an element of the female member obstructs the forward motion of the male member through a slot. Inadvertent disengagement of the buckle by rearward motion of the male member back through the slot is ostensibly prevented by the tension of the belt around the user. However, if the user wishes to employ the belt, as is often done, loosely or only partially tensioned around the body, there is no assurance provided against rearward disengagement of the Copes buckle.

It is therefore an object of the present invention to provide a safety belt buckle which ensures positive locking while at the same time may be safely fastened by the driver of a vehicle in motion.

It is another object of this invention to provide a safety belt buckle which permits the user thereof to securely fasten the buckle using only one hand.

Briefly stated, the aforesaid objects may be accomplished by a safety belt buckle comprising a connector member including a plate member, a slide composed of a first element attached to said plate member and a second element having a recess therein attached to said first element, the width of said second element exceeding that of said first element; a case member having walls defining a slot therein for passage of said second element therethrough, said slot bounded on its non-walled side by a closure including an elongated passageway therein, said passageway being sufficiently wide to permit slidable movement of said first element therealong but insufficiently wide to permit said second element to pass therethrough; a slidable locking element in said case member biased by resilient means to positively engage the recess in said second element when said second element is seated in said slot, and adapted to be moved to a non-engaging position by the application of a force opposing the bias of said resilient means; and, means for adjustably securing an end of a belt to said case member.

The invention will be better understood from the following description taken in conjunction with the accompanying drawing.

Figure 1:
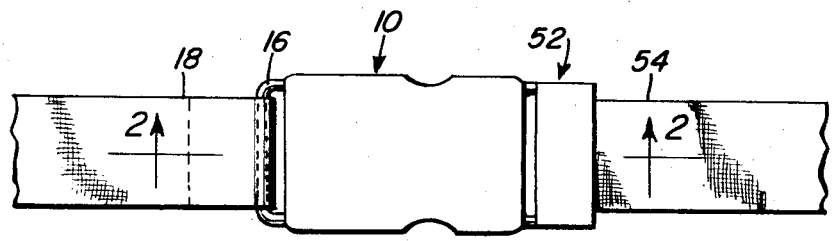
FIG. 1 is a perspective view of the safety belt buckle with the elements thereof in positive engagement.
Figure 2:
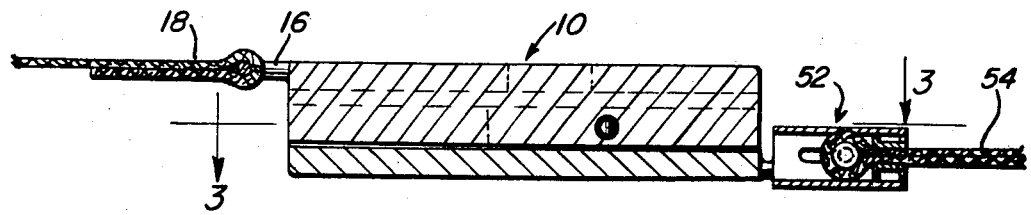
FIG. 2 is a sectional view along line 2—2 of FIG. 1.

With reference to the FIGS. 1–4, the buckle of the present invention, generally designated 10 is composed of a connector member 12 and a case member 30. Connector member 12 consists of a plate member, such as generally rectangular metal plate 14, having belt attaching means 16 at one end thereof for securing a seat or shoulder belt 18 thereto. Finger grooves 20, for the convenience of the buckle user, are formed in the side walls of plate 14. Slide 22 is mounted on or formed integrally with one face of plate 14, and preferably positioned parallel to and half-way between the side walls thereof. Slide 22 is preferably T-shaped in cross-section, and is composed of two elements; a first element in the form of an elongated shank 24 attaching slide 22 to plate 14, and a second element in the form of a generally rectangular bar 26 attached to shank 24. The width of bar element 26 measured as the dimension normal to the longitudinal axis of slide 22, must be greater than the width of shank element 24. The end of bar 26 nearest belt-attaching means 16, hereinafter the lead-in end of bar 26, is tapered for ease of insertion into case member 30. A recess, such as cylindrical bore 28, through the non-tapered portion of bar 26 is adapted to slidably receive means for positively locking case member 30 to connector member 12 when connector member 12 is fully seated in case member 30.

Case member 30 is in the form of a partially hollowed rectangular box having external dimensions generally corresponding to the external dimensions of metal plate 20. Housed within case member 30 are two compartments, 32 and 34, each adapted to receive a locking mechanism 70 therein. Case member 30 consists of a bottom wall 36 and closure members, such as compartment cover plates 38 and 40, spaced apart by upstanding parallel side walls 42 and 44 and parallel front and rear end walls 46 and 48, respectively. Cover plates 38 and 40, which include finger grooves 21 therein, may be secured to the case member 30 by screws 50 inserted flush with the plates, or by any other suitable connector means. Adjustable belt attaching means 52, which may include an adjusting roller and frictional belt engaging means, as is well known in the art, are provided at rear end wall 48 for adjustably securing a seat or shoulder belt 54 to case member 30. Interior walls 56 and 58 and bottom wall 36 define slot 60 in case member 30 between compartments 32 and 34. Slot 60 is preferably centrally positioned between side walls 42 and 44 and tapers outwardly toward rear end wall 48 to provide a tapered lead-in section for receiving the tapered lead-in end of bar 26. Compartment cover plates 38 and 40 extend beyond interior walls 56 and 58 and partially overlap slot 60 to form a partial closure of the open end of slot 60 and to define a passageway 62 between the plates to slidably receive shank 24. Interior walls 56 and 58, bottom wall 36, and the overlapping portion of cover plates 38 and 40 define a rectangular channel in which generally rectangular bar 26 of connector member 12 may snugly slide. As will be appreciated, the slot width, defined by the separation of interior walls 56 and 58, is just sufficient to permit the slidable movement of bar 26 therethrough but insufficient to permit significant movement normal to interior walls 56 and 58. Passageway 62 between the overlapping portions of plates 38 and 40 is slightly wider than the width of shank 24 of slide 22 but is narrower than the width of bar 26, such that shank 24 slides in passageway 62 when bar 26 slides in slot 60. Because the width of bar 26 exceeds the width of passageway 62, bar 26 cannot pass therethrough.

Figure 3:
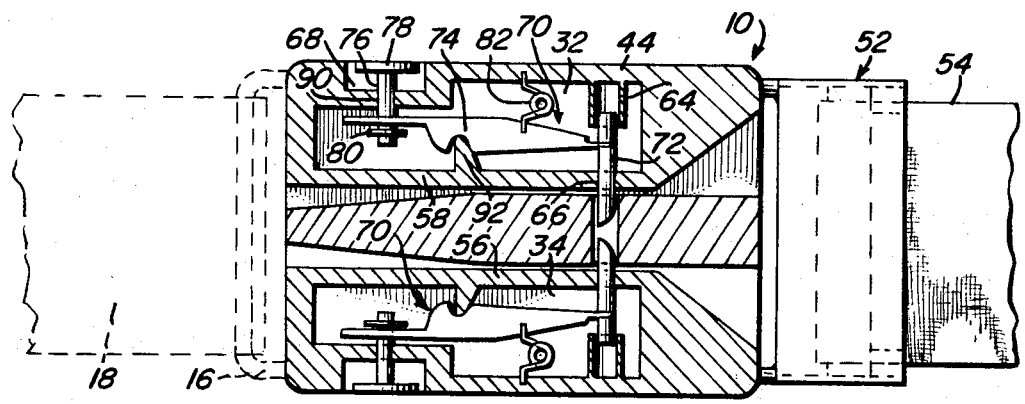
FIG. 3 is a sectional view along line 3—3 of FIG. 2.

As can be most clearly seen in FIG. 3, a locking mechanism, generally designated 70, is housed in each of compartments 32 and 34. Although a preferred embodiment of the present invention contemplates dual locking mechanisms, it will be appreciated that only one locking mechanism is necessary to securely engage connector member 12 to case member 30. Accordingly, only the mechanism housed in compartment 32 will be described herein in detail, and like numerals will be used to designate like components of the dual locking mechanisms shown in FIG. 3.

Locking mechanism 70 includes a locking element, such as generally cylindrical plunger 72. One end of plunger 72 is slidably mounted within sleeve 64 which may form a part of case member 30 and protrudes into compartment 32 from side wall 44. The other end of plunger 72 is beveled such that the beveled portion cooperates with the tapered end of bar 26 as slide 22 enters slot 60. Sleeve 64 is so positioned within compartment 32 that plunger 72 will pass through aperture 66 in interior wall 58 and engage bore 28 in bar 26 when case member 30 and connector 12 are fully seated. An elongated member, such as lifting bar 74 is housed within compartment 32 and mounted such that its longitudinal axis is generally parallel to slot 60 and generally normal to the direction of movement of plunger 72. One end of lifting bar 74 is connected to plunger 72 by engaging a V-slot therein. The other end of lifting bar 74 connects to shaft 76 of release button 78 via a cotter pin or locking ring 80, or other equivalent connecting means. Release button 78 is countersunk below the plane of side wall 44 in a recess 68 therein to prevent its accidental operation. Shaft 76 slides in a cylindrical bore defined by aperture 90 in the recessed portion of side wall 44. Resilient means, such as spring 82 is secured at one end to side wall 44 and at the other end to lifting bar 74. Spring 82 urges lifting bar 74 away from side wall 44, and thereby biases plunger 72 into the position shown in FIG. 3, i.e., protruding through aperture 66 in inner wall 58. Pivotal means, such as fulcrum 92, forms a part of interior wall 58 and protrudes into compartment 32. Fulcrum 92 contacts lifting bar 74 at a point intermediate spring 82 and the end of lifting bar 74 connected to release button 78 through shaft 76. Thus when release button 78 is depressed, the moment created by the force of the depression acting around fulcrum 92 overcomes the biasing moment of spring 82 and plunger 72 is withdrawn into sleeve 64, leaving slot 60 unobstructed for the free movement of bar 26 therethrough.

Figure 4:
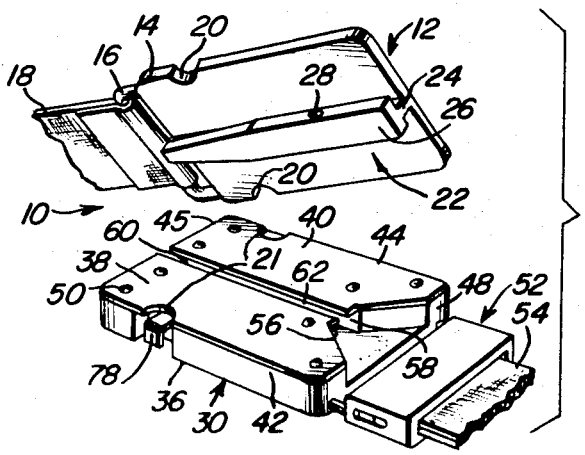
FIG. 4 is a perspective view of the individual elements of the buckle prior to engagement.

The operation of buckle 10 will be readily apparent. With the case member 30 attached to the belt on the user's right-hand side, as shown in FIG. 4, and connector member 12 grasped in the user's left hand, the tapered portion of bar 26 of connector member 12 is inserted into the outwardly tapered portion of slot 60 in case member 30. At the same time shank 24 rides in passageway 62 defined by plates 38 and 40. As connector member 12 slides into case member 30, the tapered end of bar 26 contacts the cooperatively beveled portion of plunger 72 and depresses plunger 72 into sleeve 64. Plunger 72 remains depressed until bore 28 in bar 26 is aligned with aperture 66 in inner wall 58, a which time the force of spring 82 causes plunger 72 to pass through aperture 66 in inner wall 58 and into engagement with bore 28. With plunger 72 engaged in bore 28, case member 30 and connector member 12 are firmly locked together and buckle 10 is fully secured. The free end of belt 54 may then be adjusted, with the user's right hand, for comfortable tension around the body.

To release buckle 10, the user need only depress release button 78. The force of the depression acting upon one end of lifting bar 74 overcomes the force of spring 82 tending to maintain plunger 72 in the engaged position. The lifting bar rotates about fulcrum 92 and withdraws plunger 72 from bore 28 thereby freeing connector member 12 to unobstructedly pass through slot 60 in case member 30.

While the present invention has been described with respect to particular embodiments thereof, it will be understood that numerous modifications can be made by those skilled in the art without actually departing from the scope of the invention. Accordingly, all suitable modifications and equivalents may be resorted to which fall within the scope of the invention as claimed.

What is claimed as new is as follows:

1. A safety belt buckle comprising:
   a connector member including a plate member, a slide composed of a first element attached to said plate member and a second element having a recess therein attached to said first element, the width of said second element exceeding that of said first element;
   a case member having walls defining a slot therein for passage of said second element therethrough, said slot bounded on its non-walled side by a closure including an elongated passageway therein, said passageway being sufficiently wide to permit slidable movement of said first element therealong but insufficiently wide to permit said second element to pass therethrough;
   a slidable locking element in said case member biased by resilient means to positively engage the recess in said second element when said second element is seated in said slot, and a releasing means adapted to move said locking element to a non-engaging position by the application of a force opposing the bias of said resilient means; and
   means for adjustably securing an end of a belt to said case member.

2. A safety belt buckle, as claimed in claim 1, wherein said slide is T-shaped in cross-section having an elongated shank constituting said first element and a generally rectangular bar constituting said second element.

3. A safety belt buckle, as claimed in claim 1, wherein said passageway is defined by two spaced apart plates.

4. A safety belt buckle, as claimed in claim 1, wherein said slidable element is a cylindrical plunger and said recess is a cylindrical bore through said second element.

5. A safety belt buckle comprising:
- a connector member including a plate member, an elongated, T-shaped cross-sectional slide composed of an elongated shank attached to said plate member and a generally rectangular bar having a cylindrical bore therethrough attached to said shank, the width of said bar exceeding that of said shank;
- a case member having interior walls defining a slot therein for passage of said bar therethrough, said interior walls together with side walls, end walls and a bottom wall defining two compartments in said case member separated by said slot, two spaced apart plates closing said compartments and extending beyond said interior walls to partially enclose said slot and to define an elongated passageway, said passageway being sufficiently wide to permit slidable movement of said shank therealong but insufficiently wide to permit said bar to pass therethrough;
- a locking mechanism in each compartment including a cylindrical plunger slidable in said case member, resilient means biasing said plunger to positively engage the recess in said bar when said bar is seated in said slot, and releasing means adapted to move said plunger to a non-engaging position by the application of a force thereto opposing the bias of said resilient means; and
- means for adjustably securing an end of a belt to said case member.

6. A safety belt buckle, as claimed in claim 5, wherein said releasing means comprises a release button mounted on a shaft; said plunger connects to one end and said shaft connects to the other end of a longitudinally extending, elongated member; said resilient means extends into said compartment from a side wall thereof and contacts said member at a point intermediate its ends; and, including pivotal means extending into said compartment from an interior wall thereof and contacting said member at a point intermediate said shaft and said resilient means, whereby the application of a force to said release button causes said member to rotate about said pivotal means and to remove said plunger from engagement with said recess.

7. A safety belt buckle, as claimed in claim 5, wherein one end of said bar is tapered and the lead-in section of said slot is outwardly flared.

8. A safety belt buckle, as claimed in claim 7 wherein the end of said plunger adapted to engage said recess is beveled to cooperate with the tapered end of said bar as said bar slides in said slot.

* * * * *